(12) United States Patent
Grahl et al.

(10) Patent No.: US 6,601,375 B1
(45) Date of Patent: Aug. 5, 2003

(54) WIDE PICKUP AND FEEDING SYSTEM FOR SUPPLYING CROP MATERIAL TO THE CROP INLET OF AN AGRICULTURAL IMPLEMENT

(75) Inventors: Scott V. Grahl, St. Cloud, WI (US); Kim P. Viesselmann, Grafton, WI (US)

(73) Assignee: Gehl Company, West Bend, WI (US)

( * ) Notice: Subject to any disclaimer, the term of this patent is extended or adjusted under 35 U.S.C. 154(b) by 0 days.

(21) Appl. No.: 09/927,962

(22) Filed: Aug. 10, 2001

(51) Int. Cl.[7] .......................... A01D 61/00; A01D 75/00
(52) U.S. Cl. .............................. 56/16.6; 56/341; 56/364
(58) Field of Search ..................... 56/364, 16.6, 16.4 R, 56/14.3, 14.5, 51, 97, 341; 460/16

(56) References Cited

U.S. PATENT DOCUMENTS

| | | | | |
|---|---|---|---|---|
| 3,412,535 A | * | 11/1968 | Drummond ................ | 56/14.4 |
| 3,462,922 A | * | 8/1969 | Phillips et al. ............ | 56/14.3 |
| 4,070,809 A | * | 1/1978 | Soulat ........................ | 56/13.9 |
| 4,290,259 A | * | 9/1981 | Parvin et al. .............. | 56/364 |
| 4,304,089 A | * | 12/1981 | Mescheryakov et al. ...... | 56/364 |
| 4,637,201 A | * | 1/1987 | Pruitt et al. ............... | 56/16.4 B |
| 5,255,501 A | * | 10/1993 | McWilliams ................. | 56/341 |
| 5,293,730 A | * | 3/1994 | Bich et al. ................ | 56/10.2 G |
| 5,979,153 A | * | 11/1999 | Roth ........................... | 56/341 |
| 6,370,856 B1 | * | 4/2002 | Engel .......................... | 56/341 |

* cited by examiner

Primary Examiner—Thomas B. Will
Assistant Examiner—Alicia Torres
(74) Attorney, Agent, or Firm—Boyle, Frederickson, Newholm, Stein & Gratz, S.C.

(57) ABSTRACT

A crop material feeding and directing system for use with an agricultural implement having a crop pickup which is wider than a crop inlet associated with the agricultural implement. A lower roller member includes a central portion which extends across the crop inlet, and auger sections at its ends located outwardly of the crop inlet. A pair of upper stub augers are located above the end auger sections of the lower roller member. The stub augers and the end auger sections of the lower roller member cooperate to inwardly direct crop material which is supplied by the pickup mechanism to a location outwardly of the crop inlet, and the central portion of the lower roller member functions to move the inwardly directed crop material rearwardly into the crop inlet.

17 Claims, 4 Drawing Sheets

WIDE PICKUP AND FEEDING SYSTEM FOR SUPPLYING CROP MATERIAL TO THE CROP INLET OF AN AGRICULTURAL IMPLEMENT

BACKGROUND AND SUMMARY OF THE INVENTION

This invention relates to balers for forming round bales of crop material, and more particularly to a wide pickup and feeding system for a round baler.

A conventional round baler includes a pickup mechanism which lifts crop material from the ground and supplies the crop material rearwardly to the inlet of a bale-forming chamber. Typically, the baler includes a series of side-by-side moving belts, which form the crop material into a round bale in a manner as is known. The crop inlet has a width corresponding to the width of the bale formed within the bale-forming chamber. Crop material is typically supplied by the pickup mechanism to the baler inlet from windrows of crop material formed on the ground in a conventional manner, such as by a mower or mower conditioner.

In some applications, crop windrows are formed using wide mowers or mower conditioners, which produce a windrow having a width greater than the width of the crop inlet of the baler. While the windrow width can be reduced in a subsequent operation, such as by raking, this entails an additional operation and equipment and is not an optimal solution.

A more desirable solution is to increase the width of the crop material pickup mechanism of the baler, such that the pickup mechanism has a width which equals or exceeds the width of the windrow. However, this solution results in crop material being supplied to a location outwardly of the crop inlet, such that the crop material supplied by the outer portions of the pickup mechanism must be transported inwardly to the baler inlet. A typical solution for moving crop material inwardly involves use of a single overshot-type stub auger which transports the crop material inwardly. This type of system works to move the crop material inwardly, but cannot accommodate large volumes of crop material.

It is an object of the present invention to provide a crop material feeding and directing system for an agricultural implement such as a round baler, in which the crop material is supplied to a location outwardly of a crop inlet defined by the implement. It is a further object of the invention to provide such a system which incorporates components that feed the crop material inwardly and which also feed the crop material rearwardly into the crop inlet of the implement. Yet another object of the invention is to provide such a system which utilizes crop feeding and directing components which are oriented similarly to the remaining components of the implement, to simplify driving the crop feeding and directing components. A still further object of the invention is to provide such a system which is relatively simple in its components and operation, yet which is operable to effectively transport the crop material inwardly and is capable of handling large volumes of crop material, to feed the crop material into the crop inlet of the implement.

In accordance with the present invention, a crop material feeding system for an agricultural implement includes a rotatable roller member which extends across the crop inlet, and a pair of rotatable auger sections located outwardly of the rotatable roller member. The crop inlet of the agricultural implement defines spaced apart sides, and includes a pickup mechanism which is configured to supply crop material in alignment with the crop inlet and also to locations outwardly of one or both sides of the crop inlet. The rotatable auger sections are located outwardly of each side of the crop inlet to which crop material is supplied by the pickup mechanism, and are arranged such that an upper one of the auger sections is vertically offset above a lower one of the auger sections. Each lower auger section is substantially in alignment with the rotatable roller member, and the upper and lower auger sections are operable to feed crop material inwardly toward the crop inlet from a location outward of the side of the crop inlet.

The upper auger section is preferably located forwardly of the lower auger section, and the lower auger section may be in the form of an outward extension of the rotatable roller member. Auger flighting is secured to the outward extension of the rotatable roller member to form the lower auger section. The upper and lower auger sections preferably rotate in opposite directions such that each auger section tends to move crop material toward the opposite auger section, to "pinch" the crop material between the auger sections and to transport the crop material inwardly toward the side of the crop inlet. The upper auger section terminates in an inner end which is substantially in alignment with the side of the crop inlet, such that crop material is discharged from between the upper and lower auger sections directly into the side area of the crop inlet. To provide maximum width and symmetrical feeding of crop material to the crop inlet, the pickup mechanism is arranged to supply crop material outwardly of both sides of the crop inlet. Mirror image upper and lower auger sections are located outwardly of each side of the crop inlet, to transport crop material inwardly toward the crop inlet from the outer areas of the pickup mechanism.

The invention further contemplates a method of directing and feeding crop material to the crop inlet of an agricultural implement, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a partial front elevation view showing the wide pickup and crop material directing and feeding system of the invention as incorporated into the baler of FIG. 1;

DETAILED DESCRIPTION OF THE INVENTION

Figure 1:
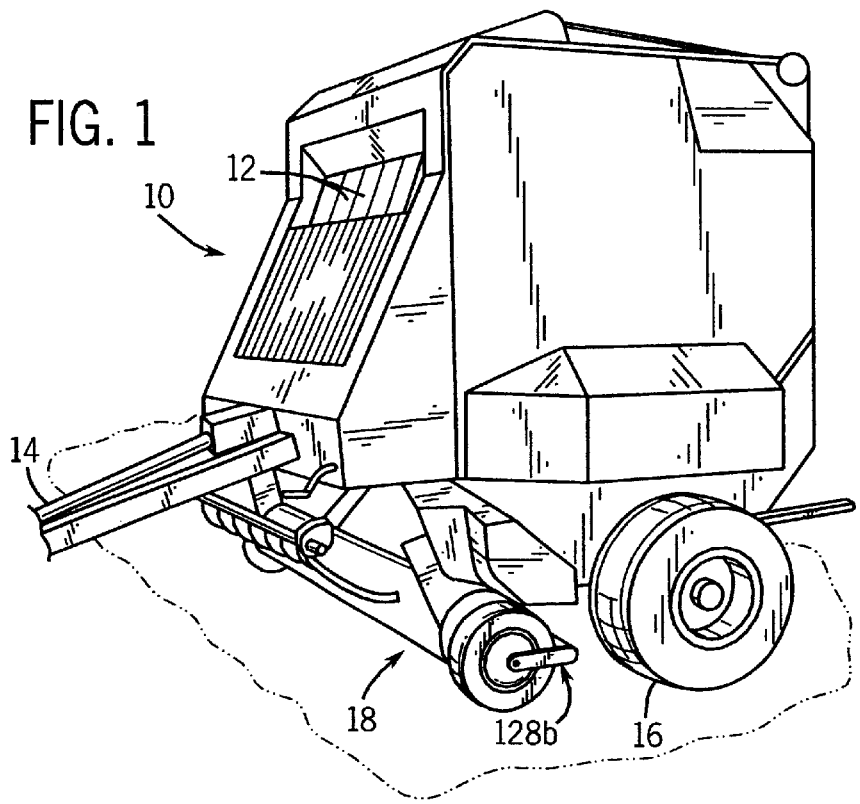
FIG. 1 is an isometric view of a round baler incorporating the wide pickup. and crop material directing and feeding system of the present invention.
Figure 3:
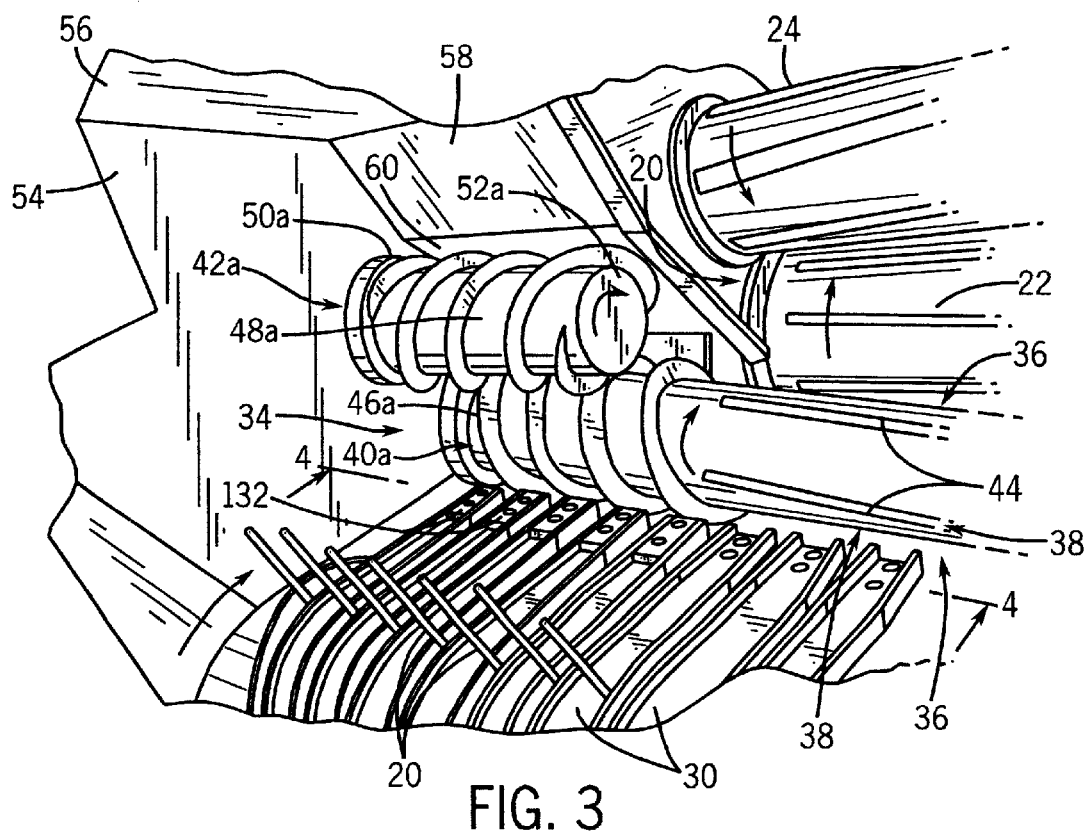
FIG. 3 is a partial isometric view illustrating the components of the wide pickup and crop material directing and feeding system at one side of the crop inlet of the baler of FIG. 1.

FIGS. 1–3 illustrate a round baler 10 incorporating the wide pickup and rop material directing and feeding system of the present invention. In a manner as is known, round baler 10 includes a series of side-by-side internal baler belts 12, a tongue 14 for connection to a tow vehicle such as a tractor, and a pair of wheels 16 for enabling baler 10 to move along the ground behind the tow vehicle. Baler belts 12 define an internal bale-forming chamber to which crop material is supplied by a pickup mechanism 18, which is operable to lift crop material off the ground and to move the crop material upwardly and rearwardly toward a crop inlet, shown generally at 20. A lower infeed roller 22 and an upper infeed roller 24 are located at crop inlet 20, and receive crop material supplied to crop inlet 20. Infeed rollers 22, 24 rotate in opposite directions of rotation, and provide a variable open throat powered infeed system as shown and described in copending application Ser. No. 09/636,427 filed Aug. 10, 2000, the disclosure of which is hereby incorporated by reference.

Pickup mechanism 18 includes a series of pickup tines 26 mounted to a rotating pickup carrier 19 (FIG. 6) which extends between a pair of pickup headers 28a, 28b, in a manner as is known. Pickup mechanism 18 further includes a frame (not shown) which extends between pickup headers 28a, 28b rearwardly of pickup tines 26, and a series of C-shaped tine guides 30 are mounted to the pickup frame, in a manner as is known. Pickup tines 26 are located between tine guides 30, traveling in slots between tine guides 30 to pick crop material up off of the ground and to move the crop material upwardly and rearwardly upon rotation of pickup mechanism 18.

Pickup mechanism 18 has a width which exceeds that of crop inlet 20. With this construction, pickup mechanism 18 extends across crop inlet 20, and the central portion of pickup mechanism 18 supplies crop material directly to crop inlet 20. The end areas of pickup mechanism 18 located outwardly of crop inlet 20, shown generally at 32a, 32b, supply crop material to locations outwardly of the sides of crop inlet 20.

In accordance with the present invention, a crop material directing and feeding arrangement, shown generally at 34, is located between pickup mechanism 18 and crop inlet 20, for receiving crop material from pickup mechanism 18 and directing the crop material to crop inlet 20. Generally, crop material directing and feeding arrangement 34 includes a lower roller member 36 having a central crop material section 38 and a pair of lower end auger sections 40a, 40b, in combination with a pair of upper stub augers 42a, 42b located above lower end auger sections 40a, 40b, respectively.

Lower roller member 36 has a constant diameter throughout its length. Central crop material directing section 38 includes spaced V-shaped bars 44, and has a length which corresponds to the width of crop inlet 20. End auger sections 40a, 40b are formed by flighting 46a, 46b, respectively, secured to lower roller member 36 in any satisfactory manner, such as by welding. End auger sections 40a, 40b have a length which corresponds to end areas 32a, 32b of pickup mechanism 18, such that flighting 46a, 46b terminate at the sides of crop inlet 20.

Upper stub augers 42a, 42b include auger cores 48a, 48b, respectively. Flighting 50a, 50b is secured to auger cores 48a, 48b, respectively, in any satisfactory manner, such as by welding. Auger cores 48a, 48b terminate in inner ends 52a, 52b, respectively, which are substantially in alignment with the sides of crop inlet 20. Upper stub augers 42a, 42b thus have a length which corresponds to that of end areas 32a, 32b, respectively, of pickup mechanism 18.

Figure 5:
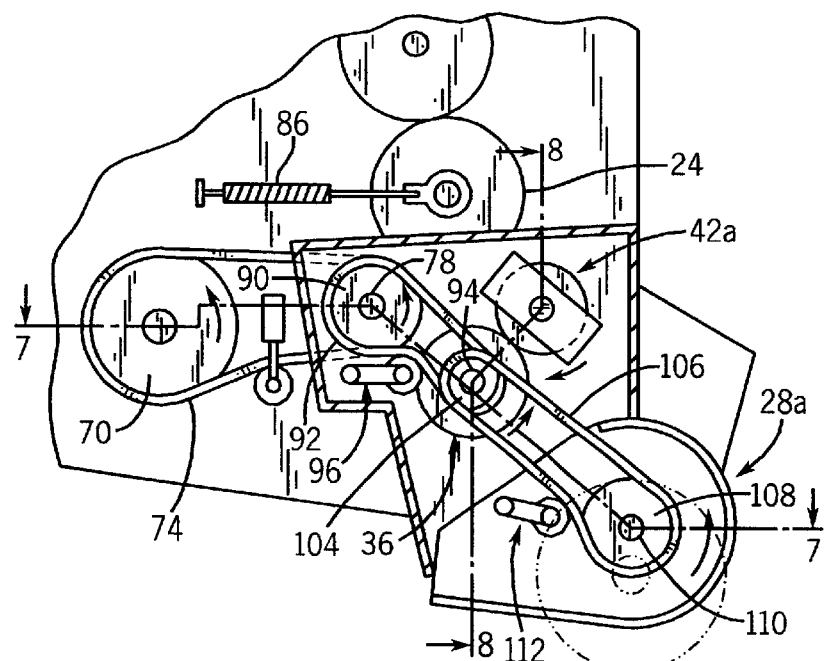
FIG. 5 is a partial section view taken along line 5—5 of FIG. 2.
Figure 6:
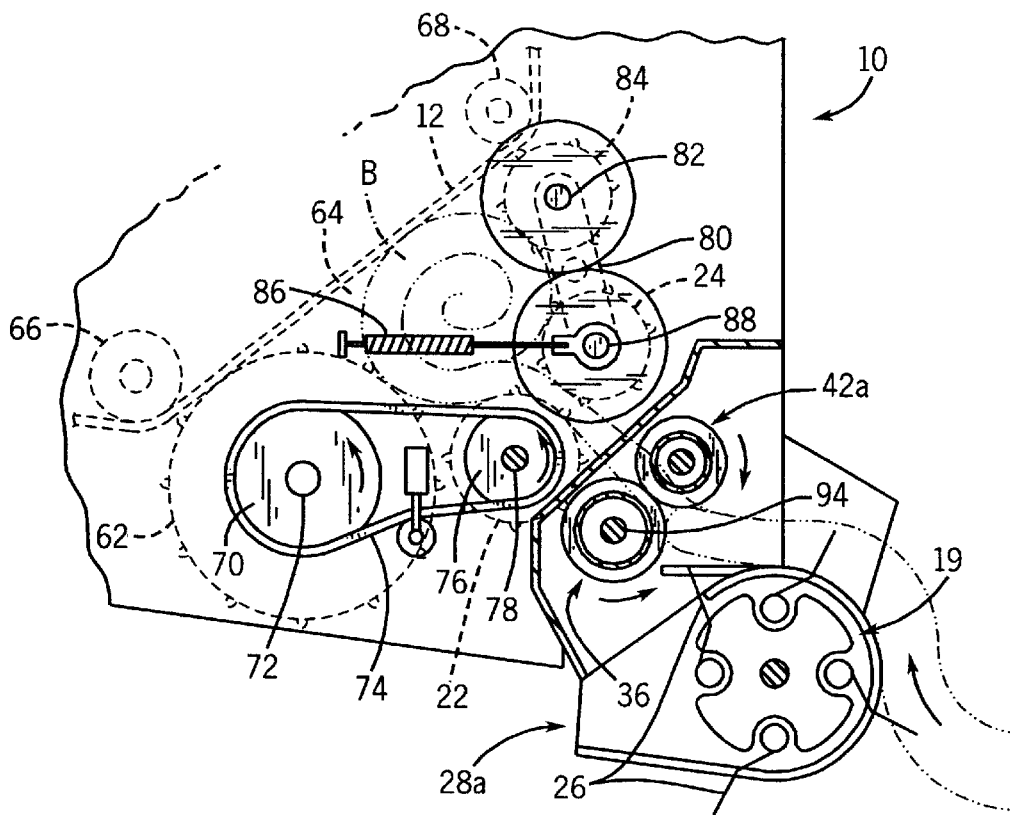
FIG. 6 is a partial section view taken along line 6—6 of FIG. 2.
Figure 7:
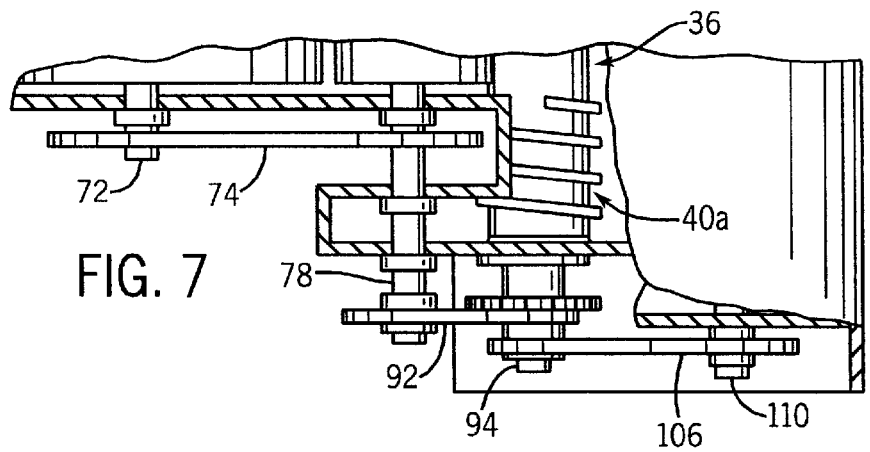
FIG. 7 is a partial section view taken along line 7—7 of FIG. 5.

Referring to FIGS. 5 and 6, lower roller member 36 and upper stub augers 42a, 42b rotate in opposite directions of rotation. When viewed in the direction of FIGS. 5 and 6, lower roller member 36 rotates in a clockwise direction, such that crop material supplied from pickup mechanism 18 is moved in an upward and rearward direction upon rotation of lower roller member 36. Upper stub augers 42 rotate in a counterclockwise direction, which directs crop material downwardly and toward lower roller member 36.

Referring to FIG. 3, upper stub auger 42a and lower end auger section 40a of lower roller member 36 extend inwardly from a side wall 54. A top wall 56 and angled rear walls 58, 60 extend inwardly from side wall 54, and cooperate to define an enclosed area within which upper stub auger 42a and lower end auger section 40a are located. Similar structure is provided at the opposite side of baler 10, for providing an enclosed area around upper stub auger 42b and lower end auger section 40b of lower roller member 36.

Each of upper stub augers 42a, 42b are located above and forwardly of the respective lower end auger sections 40a, 40b, such that the flighting of stub augers 42a, 42b is spaced above and forwardly of the flighting of lower end auger sections 40a, 40b, respectively.

FIGS. 5–8 illustrate the manner in which power is supplied to lower roller member 36 and to upper stub augers 42a and 42b. In a manner as is known, rotary power is supplied to a floor roller 62 (FIG. 6), which rotates in a counterclockwise direction and which is operable to support the bale, shown at B, during formation within a bale-forming chamber 64 defined by baler belts 12 of baler 10. Bale-forming chamber 64 is defined by a run of belts 12 extending between a pair of stationary rollers 66, 68. A sprocket 70 is mounted to the central support shaft of floor roller 62, shown at 72, and rotates in a counterclockwise direction along with floor roller 62. A chain 74 is engaged with sprocket 70, and with a sprocket 76 mounted to a jack shaft 78 which is collinear with the supporting shaft of lower infeed roller 22. As shown and described in the copending '427 application, upper infeed roller 24 is rotatably mounted between the outer ends of a pair of arms 80, the inner ends of which are pivotably mounted to a supporting shaft 82 of a stripper roll 84 located above upper infeed roll 24. A spring 86 is engaged with the supporting shaft of upper infeed roll 24, shown at 88, for biasing upper infeed roll 24 rearwardly. Arm 80 pivots forwardly against the force of spring 86 in order to accommodate large volumes of crop material, and cooperates with lower infeed roll 22 to aggressively feed crop material rearwardly into bale-forming chamber 64.

As shown in FIG. 5, a drive sprocket 90 is mounted to support shaft 78 of lower infeed roller 22 outwardly of sprocket 76, and is driven in a counterclockwise direction. A chain 92 is engaged with drive sprocket 90, and with a driven sprocket (not shown) mounted to the support shaft of lower roller member 36, shown at 94. A chain tensioner 96 is engaged with chain 92 to maintain tension in chain 92. With this arrangement, lower roller member 36 is driven in a counterclockwise direction, as noted previously.

Gears 98a, 98b are mounted to support shaft 94 of lower roller member 36. Upper stub augers 42a, 42b are mounted to support shafts 100a, 100b, respectively, and gears 102a, 102b are mounted to support shafts 100a, 100b, respectively. Gears 102a, 102b engage gears 98a, 98b, respectively, to transfer rotary power from support haft 94 of lower roller member 36 to upper stub augers 42a, 42b, respectively. With his arrangement, upper stub augers 42a, 42b are driven in a direction of rotation opposite that of lower roller member 36, i.e. in a clockwise direction with reference to FIGS. 5 and 6. Flighting 50a, 50b of upper stub augers 42a, 42b, respectively, is pitched so as to transport crop material inwardly toward crop inlet 20 and downwardly toward flighting 46a, 46b, respectively, of lower roller member 36 upon rotation of upper stub augers 42a, 42b, respectively.

As shown in FIG. 5, an outer sprocket 104 is mounted to support shaft 94 of lower roller member 36, and a pickup drive chain 106 is engaged with outer sprocket 104. Pickup drive chain 106 is also engaged with a pickup input sprocket 108 which is mounted to a pickup support shaft 110, which is rotatably supported by pickup headers 28a, 28b in a known manner. A belt tensioner 112 engages pickup drive chain 106 so as to maintain tension in pickup drive chain 106. With this arrangement, rotary input power is supplied to pickup mechanism 18 in response to rotation of lower roller member 36, to drive pickup mechanism 18.

Figure 8:
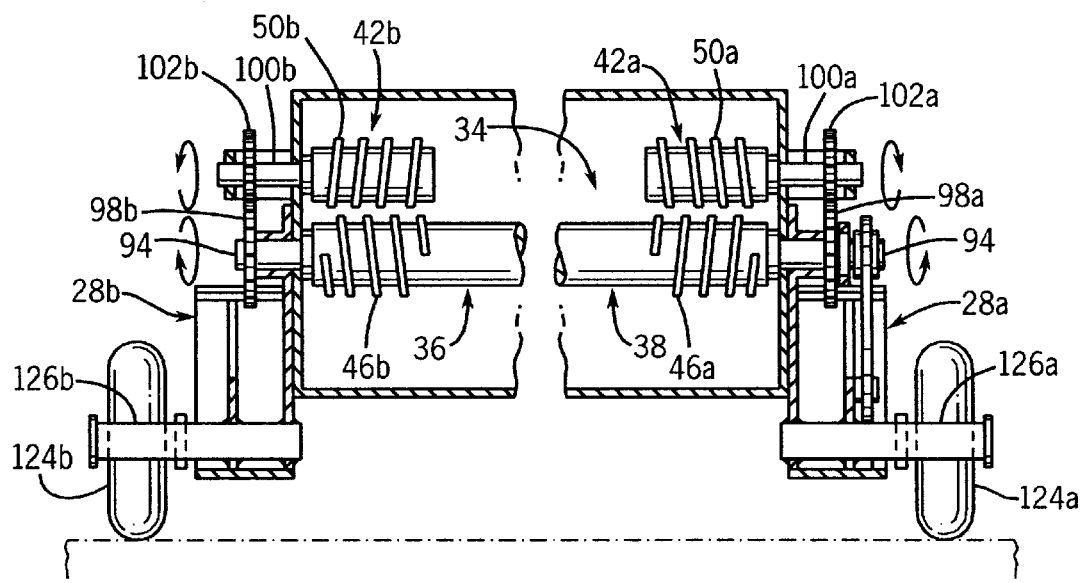
FIG. 8 is a partial section view taken along line 8—8 of FIG. 5.
Figure 9A:
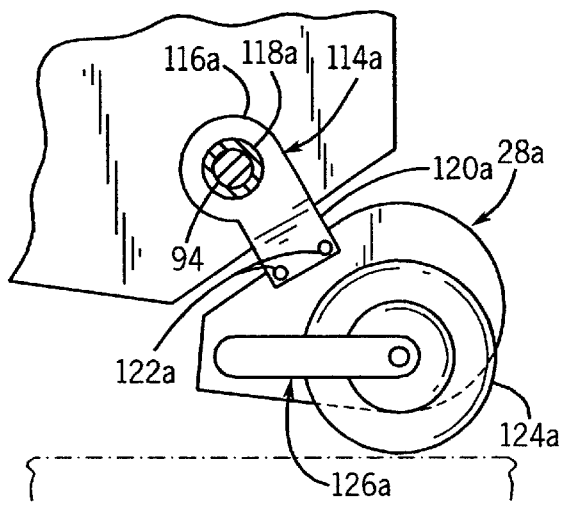
FIGS. 9a and 9b are partial side elevation views illustrating the manner in which the crop pickup mechanism is mounted to the lower front area of the baler of FIG. 1.
Figure 9B:
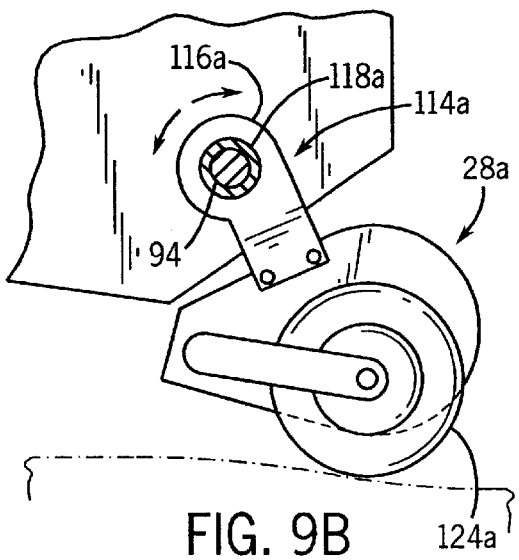

Referring to FIGS. 8, 9a and 9b, a pair of pivot arms 114a, 114b function to pivotably mount pickup headers 28a, 28b, respectively, to baler 10. Pivot arm 114a is shown in FIGS. 9a and 9b, and pivot arm 114b has a similar construction.

Pivot arm 114a includes an upper ring-shaped mounting portion 116a defining a central opening within which a bearing 118a is received. In turn, bearing 118a is mounted to support shaft 94 of lower roller member 36. Pivot arm 14a further includes a depending pickup mounting section 120a, to which pickup header 28a is mounted via a pair of bolts 122a. With this construction, pickup header 28a is pivotable about a pivot axis coincident with the longitudinal axis of lower roller member 36, defined by lower roller support shaft 94.

Pickup header 28a includes a gauge wheel 124a rotatably mounted to an axle 126a (FIG. 2), which is secured to pickup header 28a via a mounting bracket 128a secured to a gauge wheel mounting member 130a secured to pickup header 28a. Pickup header 28b includes a similar arrangement including a gauge wheel 124b mounted to an axle 126b. In this manner, gauge wheels 124a, 124b are adapted to follow the contours of the ground as baler 10 is moved by the tow vehicle, to enable pickup mechanism 18 to maintain pickup tines 26 as close to the ground as possible. Pickup headers 28a, 28b pivot during such movement about the pivot axis defined by lower roller support shaft 94, by pivoting movement of pivot arms 114a, 114b as shown in FIGS. 9a and 9b.

In operation, crop material directing and feeding arrangement 34 functions as follows to supply crop material to crop inlet 20 during movement and operation of baler 10. As noted previously, pickup mechanism 18 functions to lift crop material from the ground and to move the crop material upwardly and rearwardly. Crop material in the central area of pickup mechanism 18, corresponding to the width of crop inlet 20, is supplied directly to crop inlet 20 by central crop material directing section 38 of lower roller member 36, which has a length corresponding to the width of crop inlet 20. Bars 44 on central crop material directing section 38 positively engage the crop material to feed crop material rearwardly toward crop inlet 20. End areas 32a and 32b of pickup mechanism 18 supply crop material to locations outwardly of crop inlet 20, which engages lower end auger sections 40a, 40b and upper stub augers 42a, 42b, respectively. Such crop material is "pinched" between lower end auger section 40a and upper stub auger 42a, and between lower end auger section 40b and upper stub auger 42b, due to the counter rotation of such components and the orientation of the flighting of the respective auger sections. Such outwardly supplied crop material is directed inwardly toward crop inlet 20,. and is moved into crop inlet 20 by operation of crop material directing section 38 and the aggressive feeding action of lower and upper infeed rollers 22, 24, respectively. The various walls such as 54–60 function to ensure that crop material supplied outwardly of crop inlet 20 comes into contact with end auger sections 40a, 40b and upper stub augers 42a, 42b, to direct such crop material inwardly to crop inlet 20.

Figure 4:
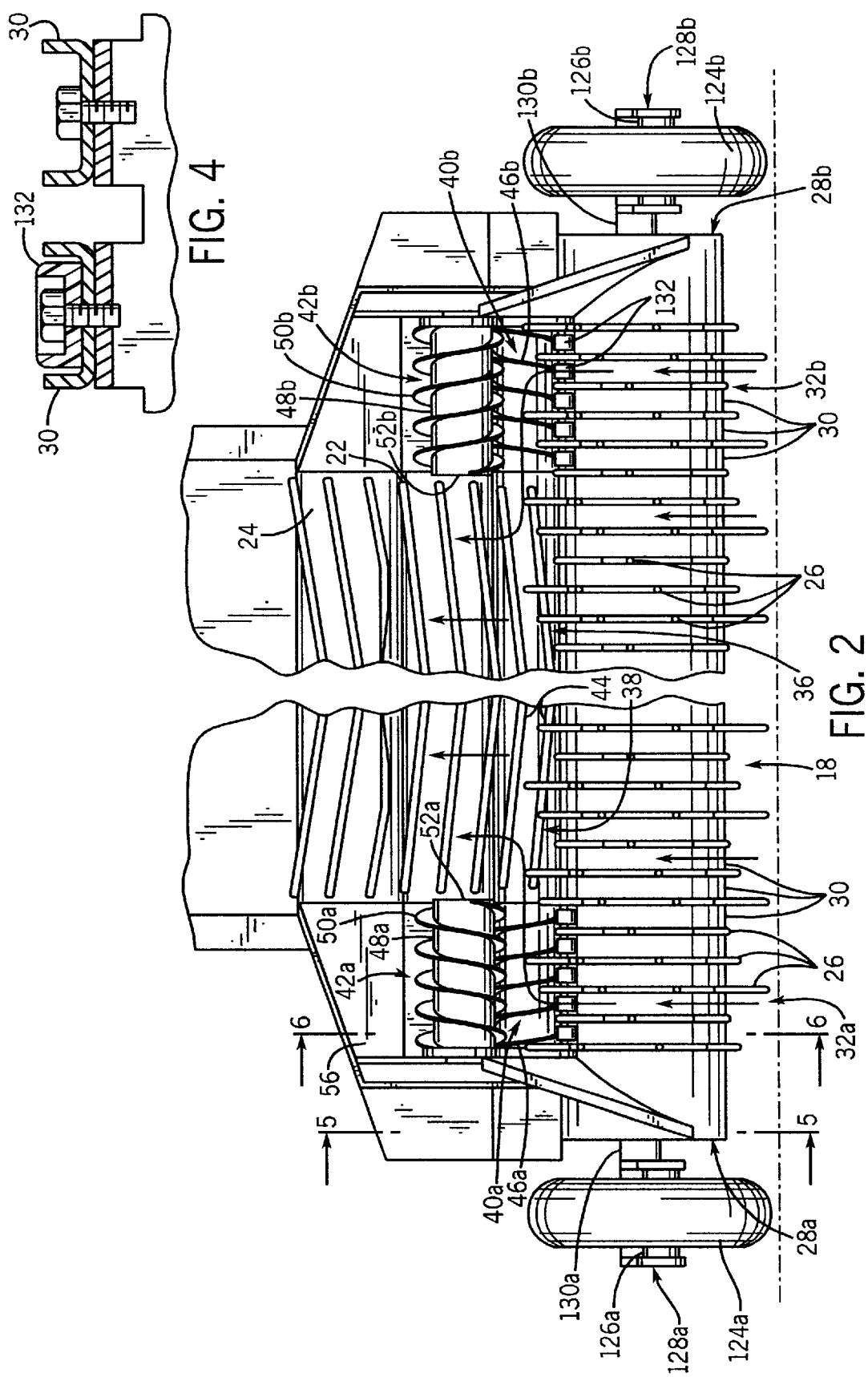
FIG. 4 is a partial section view taken along line 4—4 of FIG. 3.

Referring to FIGS. 2–4, each tine guide 30 in the vicinity of end auger sections 40a, 40b is provided with a crop deflector 132 at its rearward end, which functions to fill the channel-shaped cross section of tine guide 30. Crop deflectors 132 function to provide a smooth crop flow path for crop material as it is moved inwardly by operation of end auger sections 40a, 40b and upper stub augers 42a, 42b.

It can thus be appreciated that the crop material directing and feeding arrangement 34 of the present invention is operable to direct and feed crop material supplied outwardly of crop inlet 20 to a location where such crop material can be moved into crop inlet 20. The construction of lower roller member 36, which provides a central area that feeds crop material rearwardly and end areas 32 which feed crop material laterally, provides an efficient mechanism for moving and directing crop material toward and into crop inlet 20. Stub augers 42a, 42b provide an efficient and effective arrangement for cooperating with the end auger sections 40a, 40b of lower roller member 36 to transport crop material inwardly. Both lower roller member 36 and upper stub augers 42a, 42b rotate on horizontal axes, which are parallel to the remaining driven components of baler 10 in order to facilitate the supply of rotary power to lower roller member 36 and upper stub augers 42a, 42b.

While the invention has been shown and described with reference to specific details, it is understood that variations are possible without departing from the scope of the present invention. For example, and without limitation, it is contemplated that the crop material feeding and directing system of the invention may be employed in connection with any type of agricultural implement in which the pickup supplies crop material to areas outwardly of a crop inlet associated with the implement. Such implements may include forage harvesters, mower conditioners, windrow mergers, etc. In addition, while the lower end auger sections are shown and described as being formed on the same roller member as the central crop directing portion of the lower roller member, it is also contemplated that the lower end auger sections may be in the form of separate lower stub augers constructed in a manner similar to the upper stub auger sections, so as to form a pair of stub auger sections at each side of the lower roller member, which extends across the crop inlet. Further, while the invention is shown and described with respect to upper stub auger sections which cooperate with the lower end auger sections to transport crop material inwardly, it is also contemplated that other types of crop directing, transporting or conveying mechanisms may be employed in place of the upper stub auger sections. Further, while the invention has been shown as having two auger sections which transport crop material inwardly, it is contemplated that three or even more auger sections may be employed to transport large volumes of crop material. In addition, while the upper stub auger has been shown as being located above and forwardly of the lower auger section, it is possible that the stub auger may be located vertically above or rearwardly of the lower auger section, and that the auger flighting may be arranged to overlap. The primary feeding section of the lower rotatable member may have any satisfactory structure for feeding the crop material rearwardly, such as fingers or fins, and is not limited to the specific bar-type feeding structure shown and described. While the invention has been shown and described as incorporating a specific type of drive system employing sprockets, chains and gears in a certain configuration, other alternative drive systems may be employed such as belts and sheaves, or chain, sprocket and gear arrangements in any configuration which provides the desired degree of power and direction of rotation of the various components of the system. Further, while the invention has been described as being employed in combination with a tine-type of crop material pickup, it is understood that the invention may also be employed in combination with any other type of crop pickup arrangement which picks crop material up off the ground and which is capable of supplying crop material rearwardly toward the inlet of an agricultural implement.

Various alternatives and embodiments are contemplated as being within the scope of the following claims particularly pointing out and distinctly claiming the subject matter regarded as the invention.

We claim:

1. A crop material directing and feeding system for an agricultural implement having a crop inlet defining spaced apart sides, wherein the agricultural implement includes a pickup configured to supply crop material in alignment with the crop inlet and to a location outwardly of at least one of the sides of the crop inlet, comprising:

a rotatable roller member extending across the crop inlet and configured to feed crop material to the crop inlet which is supplied by the pickup arrangement in alignment with the crop inlet; and a pair of rotatable auger sections located outwardly of at least a first side of the crop inlet, wherein the auger sections are arranged such that an upper one of the auger sections is vertically offset above a lower one of the auger sections, and wherein the lower auger section is substantially aligned with the rotatable roller member, wherein the upper and lower auger sections are operable to feed crop material inwardly toward the crop inlet from a location outward of the side of the crop inlet, wherein the upper auger section is located forwardly of the lower auger section.

2. The crop material directing and feeding system of claim 1, wherein the lower auger section comprises an outward extension of the rotatable roller member.

3. The crop material directing and feeding system of claim 2, wherein the outward extension of the rotatable roller member has a diameter substantially equal to the diameter of the rotatable roller member in alignment with the crop inlet.

4. The crop material directing and feeding system of claim 3, wherein the lower auger section comprises auger flighting secured to the outward extension of the rotatable roller member.

5. The crop material directing and feeding system of claim 4, wherein the rotatable roller member in alignment with the crop inlet includes a series of axially extending outward protrusions which assist in feeding crop material to the crop inlet.

6. The crop material directing and feeding system of claim 1, wherein the upper and lower auger sections rotate in opposite directions of rotation and wherein each auger section includes flighting which engages the crop material and which is configured to move the crop material toward the opposite one of the auger sections upon rotation of the auger sections.

7. A crop material directing and feeding system for an agricultural implement having a crop inlet defining spaced apart sides, comprising:

a pickup arrangement which is operable to lift crop material from the ground and move the crop material toward the crop inlet, wherein the pickup arrangement is configured to supply crop material to a location outwardly of at least a first side of the crop inlet;

an elongated first rotatable member located rearwardly of the pickup arrangement, wherein the first rotatable member includes a primary feeding section in alignment with the crop inlet for feeding crop material to the crop inlet from the pickup arrangement, and at least a first end section located outwardly of the first side of the crop inlet for receiving crop material from the pickup arrangement outwardly of the first side of the crop inlet, wherein the first end section of the first rotatable member includes crop material transporting structure configured differently than the primary feeding section for transporting crop material inwardly toward the crop inlet upon rotation of the first rotatable member; and a second rotatable member located vertically above the first end section of the first rotatable member, wherein the second rotatable member includes structure for transporting crop material inwardly toward the crop inlet upon rotation of the second rotatable member, wherein the second rotatable member defines an outer end and an inner end, wherein the second rotatable member is configured such that the inner end of the second rotatable member is located adjacent one of the spaced apart sides of the crop inlet, wherein an unobstructed crop flow path to the crop inlet is defined above the first rotatable member and inwardly of the inner end of the second rotatable member.

8. The crop material directing and feeding system of claim 7, wherein the second rotatable member is located forwardly of the first end section of the first rotatable member.

9. The crop material directing and feeding system of claims 8, wherein the first end section of the rotatable member includes flighting which defines a first auger section for transporting crop material inwardly toward the crop inlet upon rotation of the first rotatable member.

10. The crop material directing and feeding system of claim 9, wherein the primary feeding section of the first rotatable member defines an irregular outer surface which functions to move the crop material rearwardly toward the crop inlet upon rotation of the first rotatable member.

11. The crop material directing and feeding system of claim 9, wherein the second rotatable member includes flighting which defines a second auger section for transporting crop material toward the crop inlet upon rotation of the second rotatable member, wherein the flighting of the second rotatable member cooperates with the flighting of the first end section of the first rotatable member to feed crop material inwardly toward the first side of the crop inlet.

12. The crop material directing and feeding system of claim 11, wherein the second rotatable member rotates in a direction opposite that of the first rotatable member.

13. The crop material directing and feeding system of claim 7, wherein the pickup arrangement is vertically movable relative to the ground for movement about a pivot axis coincident with the axis of rotation of the first rotatable member.

14. A crop material directing and feeding system for an agricultural implement having a crop inlet defining spaced apart sides, comprising:

a pickup arrangement which is operable to lift crop material from the ground and move the crop material toward the crop inlet, wherein the pickup arrangement is configured to supply crop material to a location outwardly of at least a first side of the crop inlet;

an elongated first rotatable member located rearwardly of the pickup arrangement, wherein the first rotatable member includes a primary feeding section in alignment with the crop inlet for feeding crop material to the crop inlet from the pickup arrangement, and at least a first end section located outwardly of the first side of the crop inlet for receiving crop material from the pickup arrangement outwardly of the first side of the crop inlet, wherein the first end section of the rotatable member includes flighting which defines a first auger section for transporting crop material inwardly toward the crop inlet upon rotation of the first rotatable member and a second rotatable member located adjacent the first end section of the first rotatable member, wherein the second rotatable member includes structure for transporting crop material inwardly toward the crop inlet upon rotation of the second rotatable member;

wherein the pickup arrangement includes a series of laterally spaced bars and pickup tines located between the bars, wherein each bar in the vicinity of the end section of the first rotatable member defines an upwardly open channel, and further comprising a filler member engaged within the upwardly open channel of each bar in the vicinity of the first end section of the first rotatable member for facilitating movement of crop material laterally across the bars toward the crop inlet upon rotation of the first rotatable member.

15. A method of feeding crop material to the crop inlet of an agricultural implement, wherein the implement includes a pickup arrangement which supplies crop material to a location outward of at least one of a pair of sides defined by the crop inlet, comprising the steps of:

rotating a pair of auger members located outwardly of at least one side of the crop inlet, wherein the auger members are vertically offset relative to each other and are configured to transport crop material inwardly toward the crop inlet;

rotating a rotatable roller member located inwardly of the auger members, wherein the roller member extends across the crop inlet and is located rearwardly of the pickup arrangement, and wherein rotation of the roller member is operable to feed crop material into the crop inlet from the pickup arrangement and from the pair of auger members;

wherein a lower one of the vertically offset pair of auger members extends substantially coaxially relative to the rotatable roller member, and wherein the step of rotating the lower auger member and rotating the rotatable roller member is carried out. such that the roller member and the lower auger member rotate together; and wherein an upper one of the vertically offset auger members is located forwardly of the lower auger member, and wherein the step of rotating the pair of auger members is carried out such that each auger member tends to move the crop material toward the opposite auger member.

16. The method of claim 15, wherein the step of rotating the lower auger member and the rotatable roller member together is carried out by forming the lower auger member and the rotatable roller member integrally with each other.

17. The method of claim 15, wherein the step of rotating the pair of auger members is carried out by rotating the auger members in opposite directions of rotation.

* * * * *